(12) United States Patent
Fogliano et al.

(10) Patent No.: US 7,734,545 B1
(45) Date of Patent: Jun. 8, 2010

(54) METHOD AND SYSTEM FOR PROCESSING RECURRING PAYMENTS

(75) Inventors: Frank J. Fogliano, Monroe, NY (US); Dennis J. Gniewosz, Langhorne, PA (US); Paul Gerard Trupia, Massapequa, NY (US); Riccardo M. Striano, Pelham, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 280 days.

(21) Appl. No.: 11/537,290

(22) Filed: Sep. 29, 2006

Related U.S. Application Data

(60) Provisional application No. 60/804,731, filed on Jun. 14, 2006.

(51) Int. Cl.
*G06Q 40/00* (2006.01)

(52) U.S. Cl. .................................................. 705/40

(58) Field of Classification Search ............... 705/1–45; 235/735; 345/418; 352/159; 360/246; 380/30; 438/464; 700/99; 715/256
See application file for complete search history.

(56) References Cited

U.S. PATENT DOCUMENTS

| | | | |
|---|---|---|---|
| 3,653,480 | A | 4/1972 | Yamamoto et al. |
| 4,050,375 | A | 9/1977 | Orleans |
| 4,141,078 | A | 2/1979 | Bridges et al. |
| 4,205,780 | A | 6/1980 | Burns |
| 4,264,808 | A | 4/1981 | Owens et al. |
| 4,321,672 | A | 3/1982 | Braun et al. |
| 4,396,985 | A | 8/1983 | Ohara |
| RE31,692 | E | 10/1984 | Tyburski et al. |
| 4,495,018 | A | 1/1985 | Vohrer |
| 4,617,457 | A | 10/1986 | Myers |
| 4,672,377 | A | 6/1987 | Murphy |
| 4,694,397 | A | 9/1987 | Grant et al. |
| 4,700,055 | A | 10/1987 | Kashkashian, Jr. |
| 4,713,761 | A | 12/1987 | Sharpe et al. |

(Continued)

FOREIGN PATENT DOCUMENTS

EP  0099999  7/1983

(Continued)

OTHER PUBLICATIONS

Hollywood parking Ills cost city. (3,000-space underground parking garage)(Government Activity), Fine, Howard, Mar. 18, 2002.*

(Continued)

*Primary Examiner*—Mary Cheung
*Assistant Examiner*—Tien C Nguyen
(74) *Attorney, Agent, or Firm*—Hunton & Williams, LLP

(57) ABSTRACT

According to an embodiment of the present invention, a computer implemented method and system for processing payments may involve receiving a payment file from a paying entity; identifying at least one payee from the payment file; identifying a payment amount for the at least one payee for a contribution based on a pre-existing contract between the paying entity and the at least one payee for recurring payments to the at least one payee; identifying a payment method for the at least one payee from a payee profile; and distributing the payment amount via the payment method to the at least one payee; wherein a group manages the recurring payments for the at least one payee.

18 Claims, 4 Drawing Sheets

U.S. PATENT DOCUMENTS

| | | |
|---|---|---|
| 4,752,877 A | 6/1988 | Roberts et al. |
| 4,797,913 A | 1/1989 | Kaplan |
| 4,799,156 A | 1/1989 | Shavit |
| 4,807,177 A | 2/1989 | Ward |
| 4,812,628 A | 3/1989 | Boston |
| 4,823,264 A | 4/1989 | Deming |
| 4,893,333 A | 1/1990 | Baran et al. |
| 4,931,793 A | 6/1990 | Fuhrmann et al. |
| 4,939,674 A | 7/1990 | Price et al. |
| 4,948,174 A | 8/1990 | Thomson et al. |
| 4,974,878 A | 12/1990 | Josephson |
| 4,975,841 A | 12/1990 | Kehnemuyi et al. |
| 4,988,849 A | 1/1991 | Sasaki |
| 4,992,646 A | 2/1991 | Collin |
| 4,992,940 A | 2/1991 | Dworkin |
| 5,023,904 A | 6/1991 | Kaplan |
| 5,053,607 A | 10/1991 | Carlson |
| 5,054,096 A | 10/1991 | Beizer |
| 5,080,748 A | 1/1992 | Bonomi |
| 5,111,395 A | 5/1992 | Smith |
| 5,121,945 A | 6/1992 | Thomson et al. |
| 5,122,950 A | 6/1992 | Mee |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,220,501 A | 6/1993 | Lawlor |
| 5,225,978 A | 7/1993 | Peterson |
| 5,237,159 A | 8/1993 | Stephens |
| 5,265,007 A | 11/1993 | Barnhard, Jr. et al. |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,367,581 A | 11/1994 | VanHorn |
| 5,373,550 A | 12/1994 | Campbell |
| 5,396,417 A | 3/1995 | Burks |
| 5,402,474 A | 3/1995 | Miller |
| 5,412,190 A | 5/1995 | Kopesec |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,459,482 A | 10/1995 | Orlen |
| 5,465,206 A | 11/1995 | Hilt et al. |
| 5,477,040 A | 12/1995 | Lalonde |
| 5,479,494 A | 12/1995 | Clitherow |
| 5,483,445 A | 1/1996 | Pickering |
| 5,484,988 A | 1/1996 | Hills |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,599,528 A | 2/1997 | Igaki |
| 5,603,025 A | 2/1997 | Tabb |
| 5,615,109 A | 3/1997 | Eder |
| 5,619,558 A | 4/1997 | Jheeta |
| 5,621,201 A | 4/1997 | Langhans |
| 5,640,577 A | 6/1997 | Scharmer |
| 5,642,419 A | 6/1997 | Rosen |
| 5,644,778 A | 7/1997 | Burks et al. |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,955 A | 10/1997 | Doggett et al. |
| 5,679,938 A | 10/1997 | Templeton |
| 5,679,940 A | 10/1997 | Templeton |
| 5,687,250 A | 11/1997 | Curley et al. |
| 5,692,132 A | 11/1997 | Hogan |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,153 A | 3/1998 | Powell |
| 5,748,780 A | 5/1998 | Stolfo |
| 5,751,842 A | 5/1998 | Eccles |
| 5,757,917 A | 5/1998 | Rose et al. |
| 5,770,843 A | 6/1998 | Rose et al. |
| 5,774,553 A | 6/1998 | Rosen |
| 5,783,808 A | 7/1998 | Josephson |
| 5,784,696 A | 7/1998 | Melnikof |
| 5,793,861 A | 8/1998 | Haigh |
| 5,794,221 A | 8/1998 | Egendorf |
| 5,802,498 A | 9/1998 | Comesanas |
| 5,802,499 A | 9/1998 | Sampson et al. |
| 5,819,236 A | 10/1998 | Josephson |
| 5,819,238 A | 10/1998 | Fernholz |
| 5,826,241 A | 10/1998 | Stein |
| 5,826,245 A | 10/1998 | Sandberg-Diment |
| 5,832,447 A | 11/1998 | Rieker |
| 5,832,460 A | 11/1998 | Bednar |
| 5,832,463 A | 11/1998 | Funk |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Belinger et al. |
| 5,873,072 A | 2/1999 | Kight |
| 5,878,141 A | 3/1999 | Daly et al. |
| 5,883,810 A | 3/1999 | Franklin et al. |
| 5,884,288 A | 3/1999 | Chang |
| 5,884,290 A | 3/1999 | Smorodinsky et al. |
| 5,897,625 A | 4/1999 | Gustin |

| | | | | | | |
|---|---|---|---|---|---|---|
| 5,898,157 | A | 4/1999 | Mangili et al. | 6,128,603 | A | 10/2000 | Dent et al. |
| 5,903,881 | A | 5/1999 | Schrader | 6,129,273 | A | 10/2000 | Shah |
| 5,910,896 | A | 6/1999 | Hahn-Carlson | 6,138,118 | A | 10/2000 | Koppstein et al. |
| 5,910,988 | A | 6/1999 | Ballard | 6,144,946 | A | 11/2000 | Iwamura |
| 5,915,246 | A | 6/1999 | Patterson et al. | 6,148,293 | A | 11/2000 | King |
| 5,917,965 | A | 6/1999 | Cahill et al. | 6,149,055 | A | 11/2000 | Gatto |
| 5,920,847 | A | 7/1999 | Kolling et al. | 6,149,056 | A | 11/2000 | Stinson et al. |
| 5,930,778 | A | 7/1999 | Geer | 6,173,272 | B1 | 1/2001 | Thomas et al. |
| 5,940,811 | A | 8/1999 | Norris | 6,181,837 | B1 | 1/2001 | Cahill et al. |
| 5,940,844 | A | 8/1999 | Cahill et al. | 6,185,544 | B1 | 2/2001 | Sakamoto et al. |
| 5,943,656 | A | 8/1999 | Crooks | 6,202,054 | B1 | 3/2001 | Lawlor et al. |
| 5,945,653 | A | 8/1999 | Walker et al. | 6,205,433 | B1 | 3/2001 | Boesch et al. |
| 5,956,700 | A | 9/1999 | Landry | 6,213,391 | B1 | 4/2001 | Lewis |
| 5,963,659 | A | 10/1999 | Cahill et al. | 6,227,447 | B1 | 5/2001 | Campisano |
| 5,963,925 | A | 10/1999 | Kolling et al. | 6,233,565 | B1 | 5/2001 | Lewis et al. |
| 5,966,698 | A | 10/1999 | Pollin | 6,233,566 | B1 | 5/2001 | Levine et al. |
| 5,978,780 | A | 11/1999 | Watson | 6,236,972 | B1 | 5/2001 | Shkedy |
| 5,987,435 | A | 11/1999 | Weiss et al. | 6,240,444 | B1 | 5/2001 | Fin et al. |
| 5,987,436 | A | 11/1999 | Halbrook | 6,278,981 | B1 | 8/2001 | Dembo et al. |
| 5,987,439 | A | 11/1999 | Gustin et al. | 6,289,322 | B1 | 9/2001 | Kitchen et al. |
| 5,991,750 | A | 11/1999 | Watson | 6,292,789 | B1 | 9/2001 | Schutzer |
| 6,000,832 | A | 12/1999 | Franklin et al. | 6,301,379 | B1 | 10/2001 | Thompson et al. |
| 6,003,762 | A | 12/1999 | Hayashida | 6,301,567 | B1 | 10/2001 | Leong et al. |
| 6,006,208 | A | 12/1999 | Forst et al. | 6,304,858 | B1 | 10/2001 | Mosler et al. |
| 6,009,442 | A | 12/1999 | Chen et al. | 6,321,212 | B1 | 11/2001 | Lange |
| 6,014,636 | A | 1/2000 | Reeder | 6,324,524 | B1 | 11/2001 | Lent et al. |
| 6,016,482 | A | 1/2000 | Molinari et al. | 6,338,047 | B1 | 1/2002 | Wallman |
| 6,016,484 | A | 1/2000 | Williams et al. | 6,338,049 | B1 | 1/2002 | Walker et al. |
| 6,018,718 | A | 1/2000 | Walker et al. | 6,343,279 | B1 | 1/2002 | Bissonette et al. |
| 6,026,388 | A | 2/2000 | Liddy et al. | 6,363,164 | B1 | 3/2002 | Jones et al. |
| 6,029,139 | A | 2/2000 | Cunningham et al. | 6,363,364 | B1 | 3/2002 | Nel |
| 6,032,133 | A | 2/2000 | Hilt et al. | 6,363,365 | B1 | 3/2002 | Kou |
| 6,032,137 | A | 2/2000 | Hallard | 6,366,967 | B1 | 4/2002 | Wagner |
| 6,035,281 | A | 3/2000 | Crosskey et al. | 6,374,235 | B1 | 4/2002 | Chen et al. |
| 6,035,285 | A | 3/2000 | Schlect et al. | 6,390,362 | B1 | 5/2002 | Martin |
| 6,035,287 | A | 3/2000 | Stallaert et al. | 6,393,409 | B2 | 5/2002 | Young et al. |
| 6,038,553 | A | 3/2000 | Hyde, Jr. | 6,405,173 | B1 | 6/2002 | Honarvar et al. |
| 6,041,312 | A | 3/2000 | Bickerton et al. | 6,415,259 | B1 | 7/2002 | Wolfinger et al. |
| 6,041,315 | A | 3/2000 | Pollin | 6,418,419 | B1 | 7/2002 | Nieboer et al. |
| 6,044,362 | A | 3/2000 | Neely | 6,418,420 | B1 | 7/2002 | DiGiorgio et al. |
| 6,045,039 | A | 4/2000 | Stinson et al. | 6,418,430 | B1 | 7/2002 | DeFazio et al. |
| 6,047,261 | A | 4/2000 | Siefert | 6,434,159 | B1 | 8/2002 | Woodward et al. |
| 6,052,674 | A | 4/2000 | Zervides et al. | 6,446,072 | B1 | 9/2002 | Schulze et al. |
| 6,058,380 | A | 5/2000 | Anderson et al. | 6,460,020 | B1 | 10/2002 | Pool et al. |
| 6,058,381 | A | 5/2000 | Nelson | 6,490,568 | B1 | 12/2002 | Omara et al. |
| 6,061,665 | A | 5/2000 | Bahreman | 6,493,685 | B1 | 12/2002 | Ensel et al. |
| 6,064,764 | A | 5/2000 | Bhaskaran et al. | 6,535,896 | B2 | 3/2003 | Britton et al. |
| 6,064,987 | A | 5/2000 | Walker et al. | 6,536,663 | B1 | 3/2003 | Lozier et al. |
| 6,065,675 | A | 5/2000 | Teicher | 6,554,185 | B1 | 4/2003 | Montross et al. |
| 6,067,524 | A | 5/2000 | Byerly et al. | 6,574,350 | B1 | 6/2003 | Rhoads et al. |
| 6,070,150 | A | 5/2000 | Remington et al. | 6,574,377 | B1 | 6/2003 | Cahill et al. |
| 6,070,798 | A | 6/2000 | Nethery | 6,578,000 | B1 | 6/2003 | Dodrill et al. |
| 6,073,104 | A | 6/2000 | Field | 6,578,015 | B1 | 6/2003 | Haseltine et al. |
| 6,073,113 | A | 6/2000 | Guinan | 6,609,113 | B1 | 8/2003 | O'Leary et al. |
| 6,076,072 | A | 6/2000 | Libman | 6,609,125 | B1 | 8/2003 | Layne et al. |
| 6,078,907 | A | 6/2000 | Lamm | 6,629,081 | B1 | 9/2003 | Cornelius et al. |
| 6,081,790 | A | 6/2000 | Rosen | 6,631,849 | B2 | 10/2003 | Blossom |
| 6,085,168 | A | 7/2000 | Mori et al. | 6,636,615 | B1 | 10/2003 | Rhoads et al. |
| 6,088,683 | A | 7/2000 | Jalili | 6,658,393 | B1 | 12/2003 | Basch et al. |
| 6,088,685 | A | 7/2000 | Kiron et al. | 6,661,910 | B2 | 12/2003 | Jones et al. |
| 6,088,686 | A | 7/2000 | Walker et al. | 6,704,714 | B1 | 3/2004 | O'Leary et al. |
| 6,092,056 | A | 7/2000 | Tull, Jr. et al. | 6,718,388 | B1 | 4/2004 | Yarborough |
| 6,098,053 | A | 8/2000 | Slater | 6,721,715 | B2 | 4/2004 | Nemzow |
| 6,098,070 | A | 8/2000 | Maxwell | 6,728,397 | B2 | 4/2004 | McNeal |
| 6,105,011 | A | 8/2000 | Morrison, Jr. | 6,820,058 | B2 | 11/2004 | Wood et al. |
| 6,108,639 | A | 8/2000 | Walker et al. | 6,825,940 | B1 | 11/2004 | Wu et al. |
| 6,110,044 | A | 8/2000 | Stern | 6,860,375 | B2 | 3/2005 | Hallowell et al. |
| 6,111,858 | A | 8/2000 | Greaves et al. | 6,954,896 | B1 | 10/2005 | Dodrill et al. |
| 6,115,690 | A | 9/2000 | Wong | 6,965,882 | B1 | 11/2005 | Lapstun et al. |
| 6,119,106 | A | 9/2000 | Mersky et al. | 6,970,259 | B1 | 11/2005 | Lunt et al. |
| 6,119,107 | A | 9/2000 | Polk | 6,970,855 | B1 | 11/2005 | Das et al. |
| 6,125,354 | A | 9/2000 | MacFarlane et al. | RE38,957 | E | 1/2006 | Laussermair et al. |
| 6,128,602 | A | 10/2000 | Northington et al. | 6,999,943 | B1 | 2/2006 | Johnson et al. |

| | | |
|---|---|---|
| 7,004,382 B2 | 2/2006 | Sandru |
| 7,062,456 B1 | 6/2006 | Riehl et al. |
| 7,068,832 B1 | 6/2006 | Price et al. |
| 7,072,864 B2 | 7/2006 | Brake, Jr. |
| 7,104,443 B1 | 9/2006 | Paul et al. |
| 7,133,846 B1 | 11/2006 | Ginter et al. |
| 7,163,153 B2 | 1/2007 | Blossom |
| 7,177,836 B1 | 2/2007 | German et al. |
| 7,191,952 B2 | 3/2007 | Blossom |
| 7,194,437 B1 | 3/2007 | Britto et al. |
| 7,200,255 B2 | 4/2007 | Jones et al. |
| 7,263,507 B1 | 8/2007 | Brake |
| 7,313,543 B1 | 12/2007 | Crane et al. |
| 7,317,823 B1 | 1/2008 | Price et al. |
| 7,337,148 B2 | 2/2008 | Xie et al. |
| 7,349,884 B1 | 3/2008 | Odom |
| 7,380,707 B1 | 6/2008 | Fredman |
| 7,392,222 B1 | 6/2008 | Hamilton |
| 7,401,048 B2 | 7/2008 | Rosedale et al |
| 7,401,731 B1 | 7/2008 | Pletz |
| 7,526,449 B1 | 4/2009 | Blossom |
| 2001/0011222 A1 | 8/2001 | McLauchlin et al. |
| 2001/0018666 A1 | 8/2001 | Sugiyama et al. |
| 2001/0018739 A1 | 8/2001 | Anderson et al. |
| 2001/0032139 A1 | 10/2001 | Debonnett, Jr. |
| 2001/0037300 A1 | 11/2001 | Miyazaki et al. |
| 2001/0037309 A1 | 11/2001 | Vrain |
| 2001/0047334 A1 | 11/2001 | Nappe et al. |
| 2001/0047489 A1 | 11/2001 | Ito et al. |
| 2001/0051533 A1 | 12/2001 | Wietzke et al. |
| 2002/0012445 A1 | 1/2002 | Perry |
| 2002/0013728 A1 | 1/2002 | Wilkman |
| 2002/0023055 A1 | 2/2002 | Antognini et al. |
| 2002/0026394 A1 | 2/2002 | Savage et al. |
| 2002/0032651 A1* | 3/2002 | Embrey ............... 705/40 |
| 2002/0038363 A1 | 3/2002 | MacLean |
| 2002/0046169 A1 | 4/2002 | Keresman, III et al. |
| 2002/0052842 A1 | 5/2002 | Schuba et al. |
| 2002/0055907 A1 | 5/2002 | Pater et al. |
| 2002/0069134 A1 | 6/2002 | Solomon |
| 2002/0072976 A1 | 6/2002 | Virtanen et al. |
| 2002/0077978 A1 | 6/2002 | O'Leary et al. |
| 2002/0082985 A1 | 6/2002 | MacKay |
| 2002/0087415 A1 | 7/2002 | Allen et al. |
| 2002/0087468 A1 | 7/2002 | Ganesan et al. |
| 2002/0087469 A1 | 7/2002 | Ganesan et al. |
| 2002/0091635 A1 | 7/2002 | Dilip et al. |
| 2002/0100803 A1 | 8/2002 | Sehr |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0128981 A1 | 9/2002 | Kawan et al. |
| 2002/0138398 A1 | 9/2002 | Kalin et al. |
| 2002/0169658 A1 | 11/2002 | Adler |
| 2002/0170966 A1 | 11/2002 | Hannigan et al. |
| 2002/0178071 A1 | 11/2002 | Walker et al. |
| 2002/0184151 A1 | 12/2002 | Maloney |
| 2002/0194096 A1 | 12/2002 | Falcone et al. |
| 2002/0198817 A1 | 12/2002 | Dhir |
| 2002/0199182 A1 | 12/2002 | Whitehead |
| 2003/0018557 A1 | 1/2003 | Gilbert et al. |
| 2003/0037002 A1 | 2/2003 | Higgins et al. |
| 2003/0040959 A1 | 2/2003 | Fei et al. |
| 2003/0046218 A1 | 3/2003 | Albanese et al. |
| 2003/0055675 A1 | 3/2003 | Klein Twennaar |
| 2003/0061157 A1 | 3/2003 | Hirka |
| 2003/0069780 A1 | 4/2003 | Hailwood et al. |
| 2003/0097335 A1 | 5/2003 | Muskowitz et al. |
| 2003/0101131 A1 | 5/2003 | Warren |
| 2003/0105641 A1 | 6/2003 | Lewis |
| 2003/0110442 A1 | 6/2003 | Battle |
| 2003/0120686 A1 | 6/2003 | Kim et al. |
| 2003/0130945 A1 | 7/2003 | Force et al. |
| 2003/0130952 A1 | 7/2003 | Bell et al. |
| 2003/0144942 A1 | 7/2003 | Sobek |
| 2003/0187789 A1 | 10/2003 | Karas et al. |
| 2003/0191710 A1 | 10/2003 | Green et al. |
| 2003/0200107 A1 | 10/2003 | Allen et al. |
| 2003/0208421 A1 | 11/2003 | Vicknair et al. |
| 2003/0208441 A1 | 11/2003 | Poplawski et al. |
| 2003/0225663 A1 | 12/2003 | Horan et al. |
| 2003/0233305 A1 | 12/2003 | Solomon |
| 2003/0237046 A1 | 12/2003 | Parker et al. |
| 2004/0064409 A1 | 4/2004 | Kight et al. |
| 2004/0078328 A1 | 4/2004 | Talbert et al. |
| 2004/0133516 A1 | 7/2004 | Buchanan et al. |
| 2004/0201735 A1 | 10/2004 | Baron |
| 2004/0228514 A1 | 11/2004 | Houle et al. |
| 2005/0033690 A1 | 2/2005 | Antognini et al. |
| 2005/0055254 A1 | 3/2005 | Schmidtberg et al. |
| 2005/0086178 A1 | 4/2005 | Xie et al. |
| 2005/0091156 A1 | 4/2005 | Hailwood et al. |
| 2005/0097050 A1 | 5/2005 | Orcutt |
| 2005/0144059 A1 | 6/2005 | Schuessler |
| 2005/0177480 A1 | 8/2005 | Huang |
| 2005/0209954 A1* | 9/2005 | Asher et al. ................ 705/37 |
| 2005/0228751 A1* | 10/2005 | Keown et al. ............... 705/40 |
| 2005/0261955 A1* | 11/2005 | Humble et al. ............. 705/11 |
| 2005/0289051 A1* | 12/2005 | Allin et al. ................ 705/40 |
| 2006/0035444 A1* | 2/2006 | Nakamura et al. ......... 438/464 |
| 2006/0106650 A1 | 5/2006 | Bush |
| 2006/0106717 A1 | 5/2006 | Randle et al. |
| 2006/0136353 A1* | 6/2006 | Ferguson, III ............. 705/40 |
| 2006/0178986 A1 | 8/2006 | Giordano et al. |
| 2006/0206427 A1 | 9/2006 | Love et al. |
| 2006/0282389 A1* | 12/2006 | Gupte ..................... 705/52 |
| 2006/0287953 A1 | 12/2006 | Chauhan |
| 2007/0118470 A1 | 5/2007 | Warren |
| 2007/0288334 A1* | 12/2007 | Creedle et al. ............. 705/35 |
| 2008/0193008 A1 | 8/2008 | Mount et al. |
| 2008/0288396 A1 | 11/2008 | Siggers |

FOREIGN PATENT DOCUMENTS

| | | |
|---|---|---|
| EP | 421808 | 4/1991 |
| EP | 1014318 | 6/2000 |
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/14108 | 4/1997 |
| WO | WO 97/45796 | 12/1997 |
| WO | WO 97/45814 | 12/1997 |
| WO | WO 98/09260 | 3/1998 |
| WO | WO 99/10823 | 3/1999 |
| WO | WO 00/39979 | 7/2000 |
| WO | WO 01/75730 A2 | 10/2001 |
| WO | WO 02/47022 | 6/2002 |
| WO | WO 02/063432 A2 | 8/2002 |
| WO | WO 2004/079603 | 9/2004 |

OTHER PUBLICATIONS

Actor's digital destiny: contracts expire this fall. Can SAG sway producers on new-media payment? Adweek, v47, n15, p. 22, Apr. 10, 2006.*

Annual Report Pursuant to Sectin 13 or 15(d) of The Securities Exchange Act of 1934, Form 10-K, Intelidata Technologies Corporation, Fiscal Year Ended Dec. 31, 2001.

Blockbuster running test of a stored value card, The American Banker, Sep. 1, 1995.

Ces/NaBANCO introduces stored value card technology blockbuster video is first merchant partner, Business Wire, Inc., Jan. 15, 1996.

Card Flash Daily Payment Card News, www.cardweb.com, printed Sep. 23, 2004.

Anonymous, Chase Manhattan introduces new FEDI payables product, ProQuest document ID: 7806951, ISSN/ISBN: 02686635, May 1995.

Bills, Chase Pact Done, What's Next for Web Vendors?, The American Banker, Technology Section, Jun. 3, 2002, p. 23.

Reinbach, Chase steps up treasury system, ProQuest documednt ID 8723558, ISSN/ISBN: 10459472, Nov. 1995.

Anonymous, Chasing the global trend, Cash Management News, proQuest document ID 9319923, ISSN/ISBN: 02686635, Dec. 1995.

Malhotra, Clearing House Enumerates e-Payments Ills, The American Banker, vol. 167, No. 154, Aug. 23, 2002.

Marjanovic, Corporate Services: Chase Gears Up Global Payments System Series: 16, The American Banker, vol. 160, Issue 174, Sep. 11, 1995, p. 41.

Gluck, Creating a Global Cash-Management Game Plan, Bank Systems & Technology, Feb. 1997, p. 28.

Lamond, Credit Card Transactions Real World and Online, Paying by Credit Card-Real World and Online, http://www.virtualschool.edu/mon/ElectronicProperty/klamond/credit, printed Jul. 8, 2005, 17 pages.

Lamond, Keith, Credit Card Transactions Real World and Online, http://www.virtualschool.edu/mon/ElectronicProperty/klamond/credit_card.htm, pp. 1-17, printed Jul. 8, 2005.

Dialog file 20, #10279554.

Du Pont's Electronic Payments, Corporate EFT Report, v9, n1, Dialog file 636, Accession No. 01066902, Jan. 11, 1989.

Carreker, Electronic check presentment: Capturing new technology, http://proquest.umi.com, Banking Management, Rolling Meadows: vol. 71, Issue 2, Mar./Apr. 1995, p. 32, 5 pages.

Fidelity Helps Fund Sellers Trim the Taxes They'll Owe, The Wall Street Journal, Nov. 7, 2002.

First Data markets stored-value cards, Cards International, Jan. 30, 1996, p. 5.

Norris, First data unit develops blockbuster cash card, Omaha World Hearld Sunrise Edition, Business Section, Jan. 19, 1996, p. 16.

Harsh Truth: Your Investments Likely Won't Make Any Money.

Money, Initial Launch to 200 Credit Unions, USA Today.com, Jun. 27, 2002.

Decovny, Net Scope, Banking Technology, May 1997.

Nokia Announces the World's First NFC Enabled Mobile Product for Contactless Payment and Ticketing, PRNewswire, Feb. 9, 2005.

Goode, On Profit, Loss and the Mysteries of the Mind, The New York Times, Nov. 5, 2002.

Anonymous, Operating in a multi-currency environment, ProQuest document ID 9215937, ISSN/ISBN 09589309, Oct. 1995.

Maher and Troutman, Payor's Prescription for Painless Migration to Electronic Healthcare Payments and Remittance Advices, PNC Bank, Dec. 2001.

Press Release, Mar. 5, 2004, Payment Data Systems Files Patent on Debit Card Payment Solution, American City Business Journals, Inc., Mar. 5, 2004.

Maher and Troutman, Provider's Prescription for Painless Migration to Receipt of Electronic Healthcare Payments and Remittance Advices, PNC Bank, Dec. 2001.

Anonymous, Systems spell change for foreign exchange, Global Investor, ProQuest document ID 1056152B, ISSN/ISBN: 09513604, Nov. 1996.

French, Tech Stocks: Market Movers, Investors Worry CheckFree Being Chased from Its Own Game, http://www.thestreet.com, Jun. 20, 2002.

Technology, In Brief Wachovia-InteliData Deal, May 7, 2002.

Zuckerman, The Hedge-Fund Craze, The Wall Street Journal, Jun. 12, 2002.

McDonald, The Stars in the Sky Flicker, and Fund Stars Do the Same, The Wall Street Journal, Jan. 15, 2003.

Anonymous, Visa & Carnegie Mellon Plan Online Payment Scheme, Newsbyte News Network, Feb. 15, 1995.

Financial News, Wells Fargo Rolls Out Nationwide Lockbox Check Conversion, PR Newswire Association, Apr. 22, 2003.

Armstrong, Douglas, Norwest eases difficulty of Interstate banking Bank's customers may use the same account number at any branch.

Hunt, Robert M., An Introduction to the Economics of Payment Card Networks.

Maturi, Richard, Personal Finance; When you Need to Send Cash in a Flash.

Miller, Terrie and Yan, Henry, When Custody Governs, Benefits Canada, Toronto, Feb. 1998, vol. 22, Issue 2, p. 33, 5 pages.

* cited by examiner

METHOD AND SYSTEM FOR PROCESSING RECURRING PAYMENTS

CROSS-REFERENCE TO RELATED APPLICATIONS

This patent application claims priority to U.S. Provisional Patent Application No. 60/804,731, filed Jun. 14, 2006, which is hereby incorporated by reference herein in its entirety.

FIELD OF THE INVENTION

The present invention relates generally to processing payments, and more specifically to processing residual and/or other recurring payments to members and non-members of a union or group on behalf of various paying entities.

BACKGROUND OF THE INVENTION

Currently, actors receive individual residual payments from Studios depending on the number of programs, movie appearances and/or other contribution by a performer (e.g., actor, musician, etc.) and/or participant (e.g., writers, contractors, etc.). Each Studio provides each actor with a contract which sets forth the residual payment information where each Studio prints and physically mails a check and remittance information to a union or organized group (e.g., Screen Actors Guild (SAG)) for distribution. SAG reconciles the check and remittance information.

The current process for printing and distributing residual payments involves the studios paying residuals to SAG members and non members, where actors or beneficiaries are paid individually or via a nominee/trustee. Each residual check payment from the studios may represent a single production or multiple productions. There are currently 120,000 SAG members. The studios print and send the check and remittance information to SAG for distribution to the SAG members. SAG reconciles the check and remittance information to send to the actor or nominee/trustee. It may take up to four weeks from issuance of a check to receipt by an individual actor or nominee/trustee. SAG deposits all checks returned undeliverable when the actor can not be located or is deceased without a recognized beneficiary or nominee into a SAG Trust Fund account.

In addition, similar problems generally exist with current methods for making payments to members and non-members of a group or union from different paying entities. As there is a disconnect among the participants, the traditional payment process is labor intensive, prone to mistakes and very slow. Other drawbacks may also be present.

SUMMARY OF THE INVENTION

Accordingly, one aspect of the invention is to address one or more of the drawbacks set forth above. According to an embodiment of the present invention, a method and system facilitates the ability for various paying entities to pay recipients for residual and/or other payments. The recipients may be associated with a union, group and/or other association. An exemplary embodiment of the present invention may apply to the Screen Actors Guild (SAG), which includes actors, contractors, writers, etc where the paying entity in this exemplary application may include a studio, such as a film studio.

According to an exemplary embodiment of the present invention, a computer implemented method for processing payments comprises the steps of: receiving a payment file from a paying entity; identifying at least one payee from the payment file; identifying a payment amount for the at least one payee for a contribution based on a pre-existing contract between the paying entity and the at least one payee for recurring payments to the at least one payee; identifying a payment method for the at least one payee from a payee profile; and distributing the payment amount via the payment method to the at least one payee; wherein a group manages the recurring payments for the at least one payee.

In accordance with other aspects of this exemplary embodiment of the present invention, the method may further include the step of notifying the at least one payee via en electronic transmission that the payment amount has been distributed via the payment method; wherein the paying entity is one or more of a movie studio, a television studio, a sponsor and an endorsement company and the at least one payee is a participant in one or more of a movie production, a television production, a theater production, a commercial and an endorsement; wherein a plurality of payment files from a plurality of paying entities are received, wherein the different paying entities comprise a plurality of different sources of payment; wherein the payee profile comprises a collaborative interface for one or more authorized agents and advisors; wherein the payment file is received by the group managing the recurring payments for the at least one payee; wherein the payee is not on a payroll of the paying entity; wherein the payment method comprises one or more of a direct deposit to one or more accounts, a check payment, a wire transfer, and a card product; wherein the card product supports a plurality of paying entities; wherein the at least one payee is a member of the group; and wherein the at least one payee is not a member of the group.

According to an exemplary embodiment of the present invention, a computer implemented method for processing payments comprises the steps of: receiving a first payment file from a first paying entity for a first project; receiving a second payment file from a second paying entity for a second project; identifying a payee from the first payment file and the second payment file; identifying a first payment amount based on a first pre-existing contract between the first paying entity and the payee for recurring payments to the at least one payee; identifying a second payment amount based on a second pre-existing contract between the second paying entity and the payee for recurring payments to the at least one payee; identifying a payment method for the payee from a payee profile; and distributing the first payment amount and the second payment amount via the payment method to the payee; wherein a group manages the recurring payments for the at least one payee.

According to an exemplary embodiment of the present invention, a computer implemented system for processing payments comprises a paying entity interface for receiving a payment file from a paying entity; identifying at least one payee from the payment file; and identifying a payment amount for the at least one payee for a contribution based on a pre-existing contract between the paying entity and the at least one payee for recurring payments to the at least one payee; a payment method module for identifying a payment method for the at least one payee from a payee profile; and a distribute payment module for distributing the payment amount via the payment method to the at least one payee; wherein a group manages the recurring payments for the at least one payee.

According to an exemplary embodiment of the present invention, a computer implemented system for processing payments comprises a paying entity interface for receiving a first payment file from a first paying entity for a first project; receiving a second payment file from a second paying entity for a second project; identifying a payee from the first payment file and the second payment file; identifying a first payment amount based on a first pre-existing contract between the first paying entity and the payee for recurring payments to the at least one payee; identifying a second payment amount based on a second pre-existing contract between the second paying entity and the payee for recurring payments to the at least one payee; a payment method module for identifying a payment method for the payee from a payee profile; and a distribute payment module for distributing the first payment amount and the second payment amount via the payment method to the payee; wherein a group manages the recurring payments for the at least one payee.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF EXEMPLARY EMBODIMENT(S)

Figure 1:
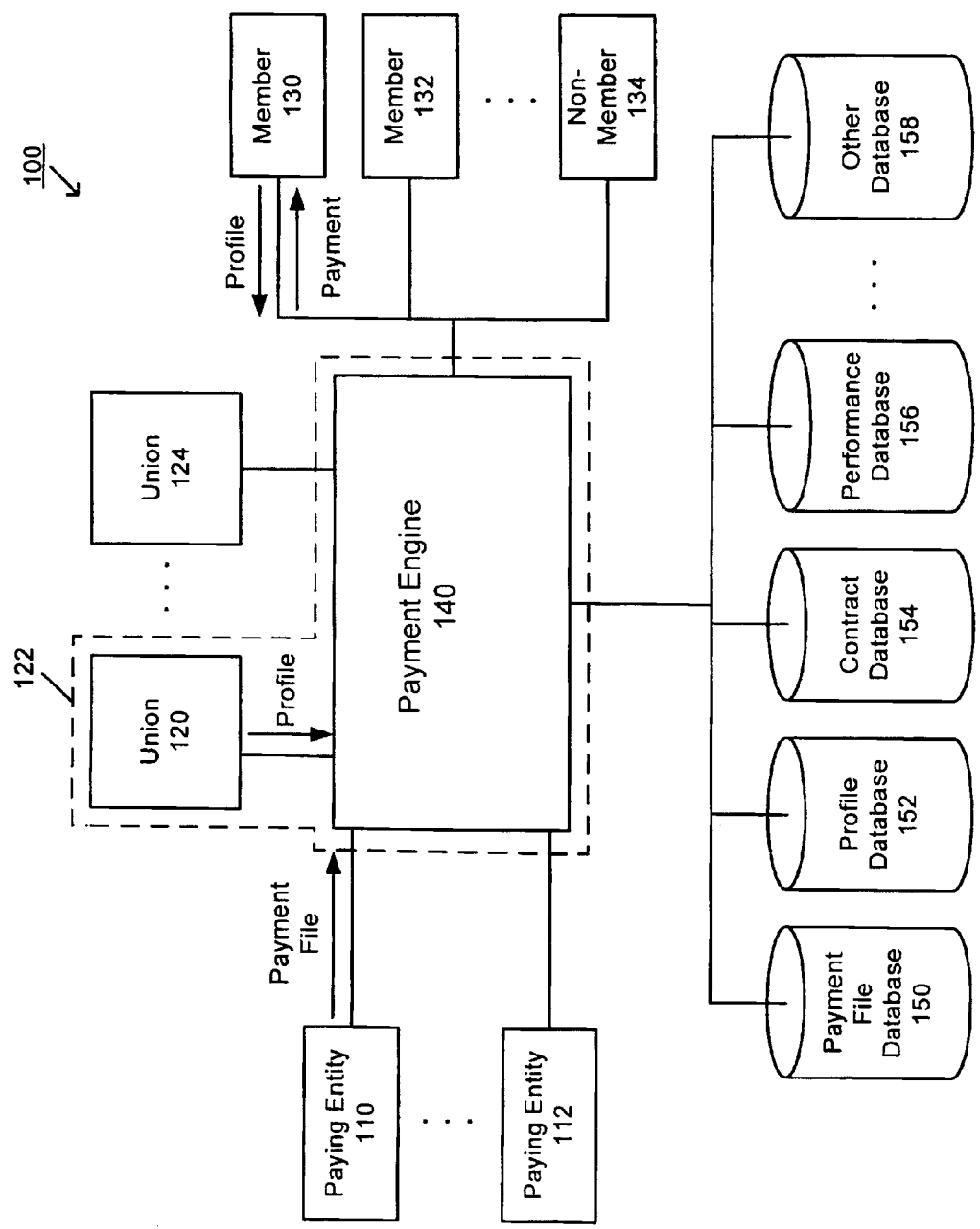
FIG. 1 is an exemplary diagram of a system for payment processing, according to an embodiment of the present invention.

An embodiment of the present invention improves efficiency of processing residual and/or other payments for recipients who may not be part of a paying entity's payroll. According to one exemplary embodiment, the invention is a method and system that automates the payment process for recipients (e.g., workers, writers, contractors, etc.) who may be associated with a union or other organized group, where the union or organized group may manage payments from various paying entities and/or provide other services for members as well as non-members.

While the detailed description is directed to an exemplary application involving the entertainment industry which may include film studios, unions (e.g., SAG, etc.), union members (e.g., actors, writers, musicians, participants, etc.), the various embodiments of the invention may be applied to other scenarios and applications involving paying entities, organized groups and payment recipients. For example, other industries may include the electronic gaming industry where software companies may pay software writers or other participants for contributions to a software game. Another application may include the temporary worker industry where paying entities may include a company employer, the organized group may include the temporary worker agency or union and the payment recipients may include the temporary workers, contractors, and/or other participants.

According to another example, the union or group may include an agency representing a group of actors, athletes, musicians and/or other performer, contributor, participant. For example, an agency may manage a group of athletes where payments to each athlete may be made individually and/or collectively from various paying entities, such as the team, endorsement companies (e.g., soft drinks, apparel, footwear, musical artist, etc.), and/or other sources of revenue. According to another example, a union, such as the National Football League players association, may represent each player of a team, where members are the players and the paying entities may include various sources of payment, including team, franchise owners, endorsements, etc. Other applications may be applied in varying scope.

Payment may include residual payments, royalty payments, rewards, winnings, and/or any other recurring payment and/or compensation in various forms. Compensation may include rights and/or privileges. For example, a form of compensation may include right to mine properties (e.g., mineral rights, etc.). The union may represent any group or association that manages payment and/or provides other services to the members. For example, lottery winners may elect periodic payments over a time period (e.g., 20 years). The lottery winners may receive the periodic payments from the state lottery where the group of winners may be represented by an agency or group. Yet another application may involve the literary industry where an organized group, such as a publisher or other entity, may manage a group of writers. In this application, the paying entities may include book distributors, book vendors, etc. Other arrangements applied to other industries and/or applications may be realized.

FIG. 1 is an exemplary diagram of a system for payment processing, according to an embodiment of the present invention. A payment process system 100 of an embodiment of the present invention may include a Payment Engine 140 that receives information electronically from Paying Entity 110, 112 (e.g., movie studios, television studios, publisher, company, etc.) and processes payments (e.g., residual payments, recurring payments, royalties, endorsement payments, etc.) for one or more members 130, 132 (e.g., an actor, writer, musician, temporary worker, player, contractor, participant, contributor, designated agent, etc.) who are part of a union or other organized group 120, 124 (e.g., actors union or association, writers union or association, directors union or association, contractors union or association, musicians union or association, sports league, other union, association, group, etc.). In addition, payment may be made to non-members, as illustrated by Non-Member 134.

Payment Engine 140 may be affiliated or associated with a Union representing a group of individuals or entities. In the exemplary embodiment involving the film industry, a screen actors guild (SAG) may represent a union of actors and/or other participants. Union 120 may host or support Payment Engine 140. In this example, the processing of payments may appear to be performed by Union 120, as a single consolidated unit, as shown by 122. For example, a paying entity, such as Studio 110, 112, may transmit a payment file to Union 120, which may include an integrated Payment Engine 140.

According to another example, Payment Engine 140 may be separate and distinct from Union 124. For example, a paying entity may transmit a payment file to Payment Engine 140. While a single illustrative block, module or component is shown, these illustrative blocks, modules or components may be multiplied for various applications or different application environments. In addition, the modules or components may be further combined into a consolidated unit. Other architectures may be realized. The modules and/or components may be further duplicated, combined and/or separated across multiple systems at local and/or remote locations.

Upon receiving the payment file (or a payment instruction), Payment Engine 140 may access databases and/or other sources of information to identify one or more recipients, an associated payment amount, a preferred payment method and/or other relevant information for effectively processing payments. For example, Payment Engine 140 may access and/or maintain Payment File Database 150, Profile Database 152, Contract Database 154, Performance Database 156 and/or other database 158. The databases may be further combined and/or separated. The databases may reside at a single location or separated through multiple locations. In addition, the databases may be supported by Union 120 or an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different payment environments and platforms.

In addition, Payment Engine 140 may have access to other sources of data and/or data feeds that identify other metrics and/or information that may be relevant for processing payments. For example, a member may have a contract that sets forth compensation based on a number of books, DVDs, CDs, etc. sold for a time period. The compensation may be based on a portion or a percentage of the revenues generated. Other payment arrangements may be realized. Thus, Payment Engine 140 may have access to data sources that may identify the number of episodes played, number of CDs sold, number of downloads of a song, commercial, etc., number of subscribers to a ring tone, and/or other metric for a particular member. For example, Payment Engine 140 may have access to a popular book store website that identifies the number of books that have been sold over a period of time. Other products (e.g., CDs, DVDs, etc.), services (e.g., subscriptions, etc.) and/or merchandise (e.g., action figures, apparel, games, etc.) may be tracked from various websites and/or other sources of information.

Payment File Database 150 may store payment files received from multiple paying entities 110, 112. For example, a film studio may transmit a payment file with a list of actors and a corresponding payment amount. In another example, the film studio may transmit a lump sum with corresponding remittance data. The data may be parsed and formatted via various factors. For example, the data in the payment file may be used to sort data by actor, by episode, by project, etc.

Profile Database 152 may store and maintain profile information for each member as well as non-members. Each profile may identify a recipient, a method of payment, frequency of payment, preferred notification method, etc. The method of payment may include direct deposit to various accounts (e.g., checking, savings, investments, etc.), check payment, wire transfer, financial instruments, card product, etc.

Contract Database 154 may store and maintain data concerning a contract or agreement between a recipient and a paying entity for determining a payment amount, including rates, terms, conditions, etc. In addition, a member may have multiple contracts for various projects, including movies, productions, shows, etc. Other contracts may involve DVD, CD, merchandise, endorsements, appearances, services, etc. In addition, the contract may dictate that payment is not made until certain conditions or milestones are realized, e.g., $X million in ticket sales, etc. For some actors, a contract may specify that the actor receives a percentage of movie profits after a certain amount in ticket sales has been reached.

Performance Database 156 may store and maintain data concerning projects, productions, movies, shows, television episodes, syndicated series, commercials, endorsements, products, ring tones, voice over, music, and/or other source of revenue. Performance Database 156 may be used to determine residual payments for past work. For example, actors may receive $X for current new episodes while receiving payment for syndicated episodes from years ago. Through an embodiment of the present invention, the actor or recipient may receive a single payment for these multiple streams of revenues or other preferred mode of receiving payment. Other sources of revenue and/or payment may include DVDs, voice over in animated movies, iPod, games, video on Internet, interactive web pages, books, ring tones, and/or other revenue generating mediums. Performance may include various forms of contributions to a project. For example, contributions may be made by writers, musicians, artists, voice over contributors, etc.

Payment Engine 140 of an embodiment of the present invention may also support regular or per diem payments as well as other increments of payment. For example, smaller roles (e.g., audience, minor characters, etc.) may receive a per diem payment, which may be directly funded to a card product (e.g., debit card, stored value card, etc.) or delivered directly to a bank account. The frequency of payments may also be adjusted. In addition, payments may be made conditional, e.g., based on a predetermined event, such as completion of a project or phase of a project, after a level of profit is reached, etc.

Another embodiment of the present invention may be applied to the general contract and/or temporary worker market. In this application, a member may receive payment into an account or card (or other preferred payment method). Payment data for purposes of filings and reconciliation may be automatically integrated into the payment systems of both the employment firm as well as the employer.

Figure 2:
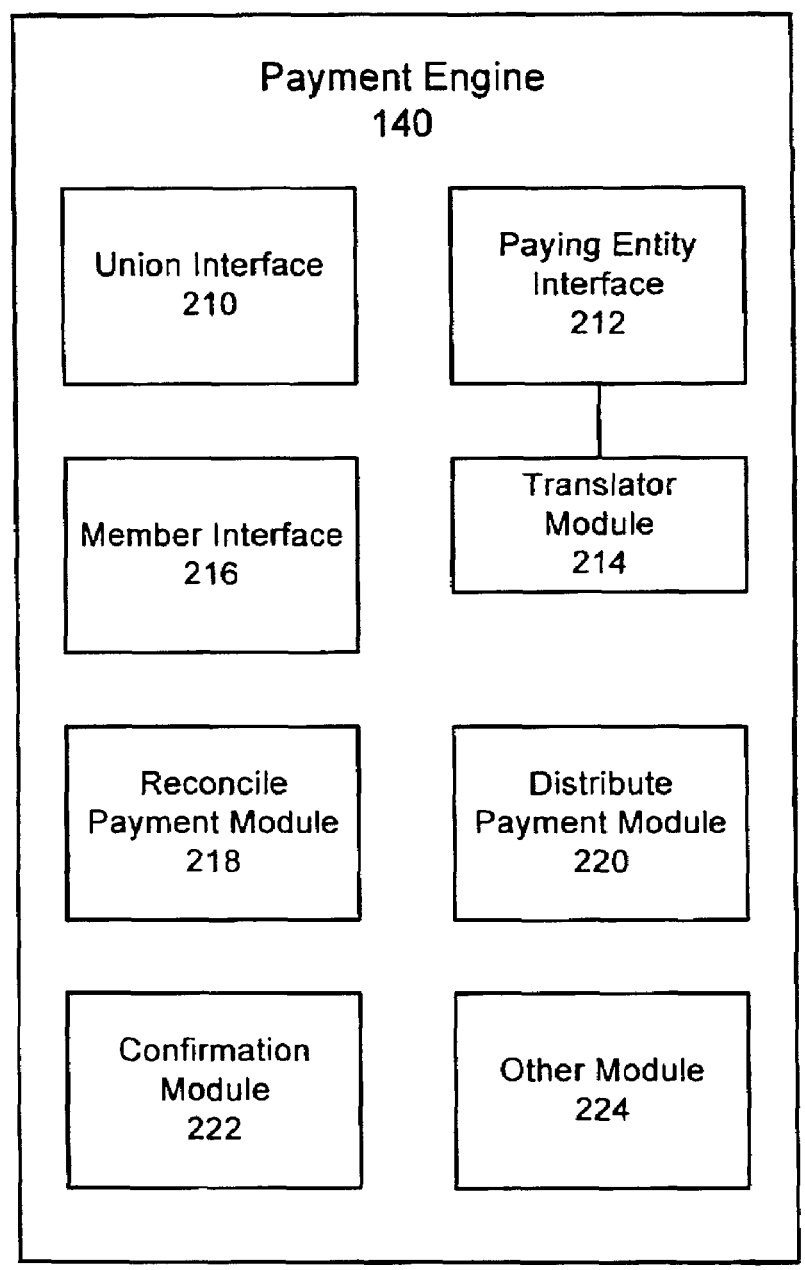
FIG. 2 is an exemplary diagram of details of a payment engine, according to an embodiment of the present invention.

FIG. 2 is an exemplary detailed diagram of a payment engine, according to an embodiment of the present invention. For example, Payment Engine 140 may include various modules and interfaces for processing payments, according to an embodiment of the present invention. Payment Engine 140 may include Union Interface 210, Paying Entity Interface 212, Translator Module 214, Member Interface 216, Reconcile Payment Module 218, Distribute Payment Module 220, Confirmation Module 222 and/or other modules, interfaces and/or processors, as represented by Other Module 224. While a single illustrative block, module or component is shown, these illustrative blocks, modules or components may be multiplied for various applications or different application environments. In addition, the modules or components may be further combined into a consolidated unit. Other architectures may be realized. The modules and/or components may be further duplicated, combined and/or separated across multiple systems at local and/or remote locations.

According to another embodiment of the present invention, Payment Engine 140 may host a website or other electronic interface where the paying entity may electronically submit payment files and members (or designated agents) may view payment information.

A union representative may access Union Interface 210 to upload or transmit a membership file to Payment Engine 140. The membership file may include a list of members, including profile information, etc. In addition, a union representative may also send updates to the membership file through Union Interface 210.

For example, SAG may electronically upload or transmit a membership file to Payment Engine 140. The transmission options available to SAG may include an integration agent, which may include a web-browser application that enables HyperText Transfer Protocol Secure (HTTPS) transmissions, a File Transfer Protocol (FTP) connection with PGP encryption, and/or other electronic transmission. According to one example, SAG may determine from the member how they elect to receive their payments and update the member's profile accordingly. SAG may then transmit changes and/or updates to the member profiles and/or transmit new enrollments to the payment engine. Payment Engine 140 may have access to a central repository (e.g., Profile Database 152) for the members' payment information.

A paying entity representative may access Paying Entity Interface 212 to upload or transmit a payment file to the Payment Engine 140 for payment processing. As Payment Engine 140 may receive payment files in different formats from different paying entities, the Payment Engine 140 may include a Translator Module 214 for converting or formatting the payment files into a uniform format to facilitate payment processing.

According to an embodiment of the present invention, Payment Engine 140 may deploy an integration agent at the Paying Entity 110, 112. The integration agent may include a web-browser application that enables HTTPS transmissions between the Paying Entity and the Payment Engine. The integration agent may monitor and track the file transmission process between the Paying Entity and the Payment Engine. Once a film/program runs, the Paying Entity may identify the residual payment and transmit the payment and remittance details to the payment engine. The Paying Entity may transmit the payment and remittance details in one file or separate payment and remittance files to the Payment Engine. The remittance data may include detailed payment information. In addition, the Payment Engine may advise the Paying Entity of any formatting or other errors when the file is loaded into the Payment Engine (e.g., member could not be located in the payment engine).

According to an exemplary scenario, upon receipt of the residual payment and remittance information from the Paying Entity, the payment engine may generate a file and transmit it to the Union via the integration agent, which may be a web-browser application that enables HTTPS transmissions, a FTP connection with PGP encryption and/or electronic transmission. The file may contain all of the required data elements so the Union may validate the Paying Entity payment information, reconcile the differences and request corrections. The Union may determine what information will be provided to their members via their website.

Paying Entities may make payments to individual members 130 as well as lump sum payments to a group of actors, contractors, workers, etc. for a particular project, such as a movie. Payment Engine 140 may then divide up with the lump sum payment according to contract specifics, instructions from the Studio and/or actor profile information. In addition, a Studio may make a single payment for multiple residual payments. Further, a Studio may group payments by episode or other criteria to provide a recipient (e.g., an actor, etc.) with a single payment for multiple projects/events or multiple types of projects/events.

Member Interface 216 may be accessed by a recipient, such as actor, contractors, musicians, and/or other entity represented by a union or association. For example, a member may input and/or update profile information, view transaction summary data, generate reports and/or perform other operations through Member Interface 216. Details concerning the modules of Actor Interface 216 are discussed below in connection with FIG. 3. Interface 216 may accessed by non-members as well.

Reconcile Payment Module 218 may identify a member (or payee) and associate a payment amount to that member (or payee), according to contract specifics and/or other agreements. The payment files from Paying Entities 110, 120 may include payment and remittance details. Upon receipt, the Payment Engine 140 may cross reference certain criteria (e.g., member ID) against Profile Database 152 to identify the member, determine a payment method and generate the appropriate payments. For example, as residual payments may include payments from a member's performance or contribution on television shows from decades ago, a comprehensive Performance Database 156 may be accessed to properly identify the payments (e.g., television show, episode, date, etc.). In addition, the payment engine 140 may also consolidate a member's performance or contribution in multiple venues (e.g., television shows, movies, commercials, voice over, etc.) into a single payment.

Distribute Payment Module 220 may identify a preferred payment method and distribute the payment amount via the preferred payment method to the recipient. After a payment file from Paying Entity 110, 112 is processed, Payment Engine 140 may distribute payments to recipients 130, such as participants, designated Agents, a company and/or other identified recipient. The payment engine 140 may make payments according to a member's profile information maintained in Profile Database 152. For example, a member (or designated agent) may identify several different mechanisms for receiving the payment, which may include payment to one or more accounts, a card which may be funded by multiple Paying Entities, as well as a physical check. Profile information may include identification data, union membership data, contact data (e.g., phone, address, email), authorized agent data, payment method data (e.g., account, check card, etc.), charity preferences and associations, etc.

Confirmation Module 222 may inform the member (and/or recipient) that payment has been made. For example, the member may select various modes of communication, such as email, text message, phone message, ring tone, etc. For example, a confirmation email to a member may be generated by the payment engine, advising the member that a payment was initiated via their chosen payment method (e.g., direct deposit, card, check, etc.) and they should visit a website or other interface to confirm the payment amount and remittance details. The website may be hosted or appear to be hosted by the Union. In addition, the Union may mail a paper statement with the remittance information for each residual payment regardless of which payment method the member chooses.

Figure 3:
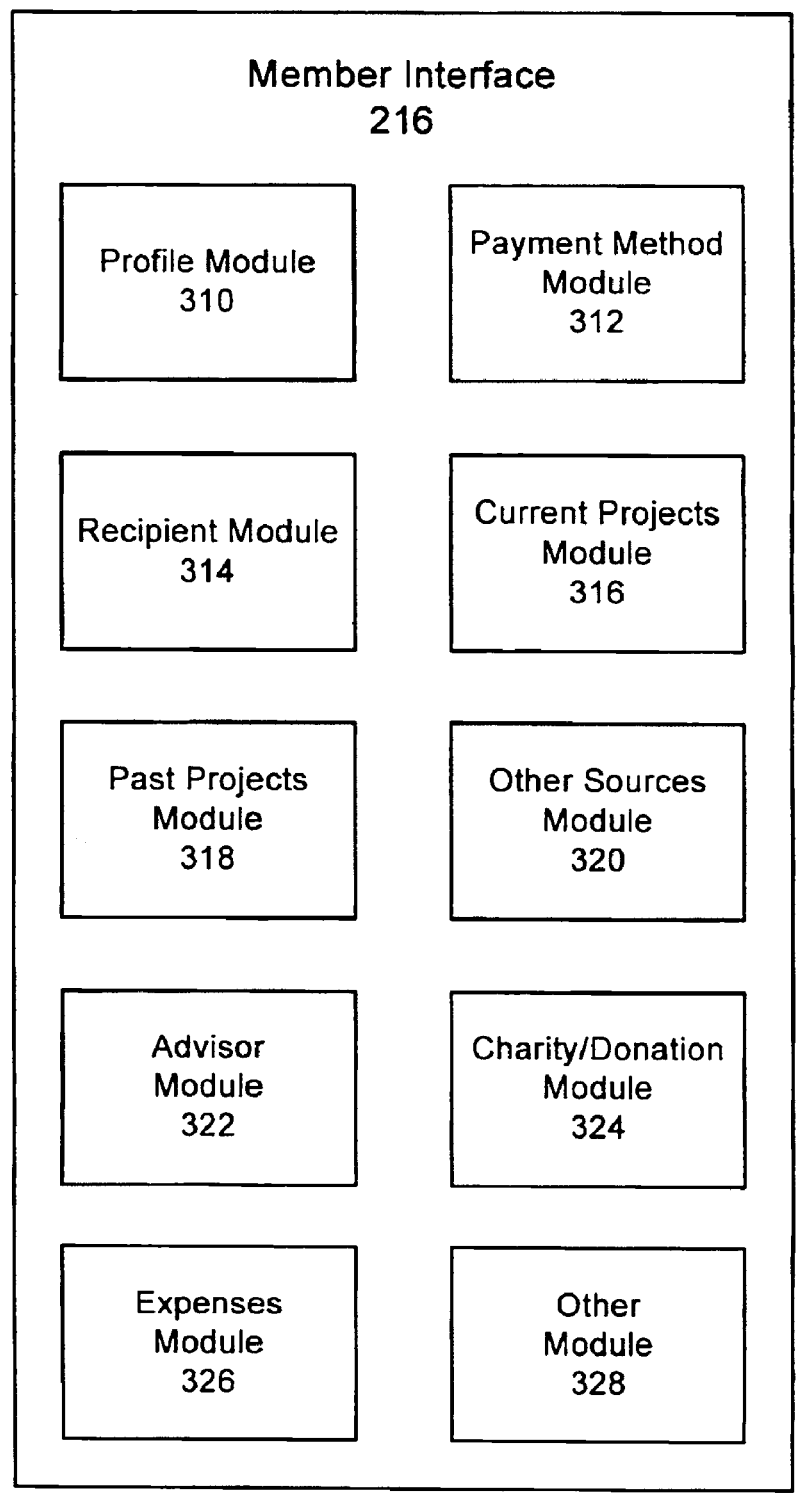
FIG. 3 is an exemplary diagram of details of a member interface of the payment engine, according to an embodiment of the present invention.

FIG. 3 is an exemplary diagram of details of a member interface, according to an embodiment of the present invention. According to an exemplary embodiment of the present invention, Member Interface 216 may include a Profile Module 310, a Payment Method Module 312, a Recipient Module 314, a Current Projects Module 316, a Past Projects Module 318, a Sources Module 320, an Advisor Module 322, a Charity/Donations Module 324, an Expenses Module 326 and/or other modules, interfaces and/or processors, as represented by Other Module 328. The functionality illustrated by FIG. 3 may also be provided to non-members as well. While a single illustrative block, module or component is shown, these illustrative blocks, modules or components may be multiplied for various applications or different application environments. In addition, the modules or components may be further combined into a consolidated unit. Other architectures may be realized. The modules and/or components may be further duplicated, combined and/or separated across multiple systems at local and/or remote locations.

A profile may be created for each union member through Profile Module 310, where the profile may contain a combination of the following information: Member Name; Union Member Number or other identifier; Member's Government Issued Identification Number (e.g., SSN, Passport/Green Card number, Tax ID, etc.); Member's Date of Birth; Member's Mailing Address; Member's Email Address and/or other personal information.

Payment Method Module 312 may support the member's preferred payment method(s). For example, the member may identify one or more payment methods, such as direct deposit to checking, savings and/or other account, check payment, wire transfer, investment account, card product, etc. Check payment may include ship to address: member and/or alternate address. Direct Deposit payment may include Member's ABA Number, Member's Account Number, Account Type: Checking/Savings. Card payment may include Member's Electronic Deposit Account (EDA) Number, Member's Card Number, Member's Maiden Name, Member's Telephone Number (e.g., home, cell, business, etc.). The card product may include a pre-loaded card that supports payments from multiple paying entities as well as multiple types of paying entities. In addition, the card product may include a debit card, check card, stored value card, co-branded card, credit card, etc. or other payment instrument.

A member may identify different payment methods for various projects, etc. For example, a member may indicate for a movie production, the payment is sent to a first account by direct deposit. Payment may be divided into multiple accounts (e.g., 70% to a first account and 30% to a second account) as well as multiple payment methods (e.g., 50% to checking account, 25% to card product and 25% to investment accounts). In addition, the member may identify a different payment method for other activities, such as DVD, CD, and/or other sales from merchandise and/or services. For residual payments, the member may identify yet another payment method, such as direct deposit to an account or a card product. For other members, per diem payments may be sent to a card product. The payment may also be divided among multiple accounts or payment receiving devices (e.g., card product, investment accounts, etc.). In addition, the member may request to receive payment in foreign currencies (e.g., euros, pounds, yen, etc.).

The payment engine may generate a check print file and send the file to the check print application for processing. The payment engine may print, bundle and ship the checks to a Union so they can mail the checks and detailed remittance information to the member. Alternatively, the payment engine may mail the checks directly to the members in a customized envelope with the Union's return address. The check print application may provide the various acknowledgement/fulfillment reports to the Union. Reports may include Acknowledgment Report (e.g., total number of items and dollar amount by account number (available via fax or email); Error Report (e.g., rejected items with description (available via fax or email)); Check Reference File (e.g., account number, check number, issue date, check amount, payee name, etc (available via secure FTP)); and Transmittal File (e.g., account number, total number of items, total dollar amount of checks issued, starting and end check numbers. (available via secure FTP)). In addition, other reports may also be generated by the system.

The check print file passed from the payment engine to the check print application may be a consolidated file of payment and remittance information. If the Paying Entity sends separate payment and remittance files, the payment engine may need to match and consolidate the payment and remittance information prior to sending the check print file to the check print application. Another option is for the payment engine to print the direct deposit and card statements on behalf of the Union and the statements can either be mailed to the member by the Union or the payment engine at an additional cost.

Recipient Module 314 may identify a payment recipient (s). A member may identify one or more recipients, such as an authorized agent who may oversee the member's accounts. In addition, the member may set up a corporation or other entity as a receiving entity. For example, each member may be assigned a member number when they join the union (or other organized group). A member can appoint a nominee to receive residual payments on their behalf or a nominee/trustee can be designated to receive residuals on behalf of the member in the event of the member's death. The nominee/trustee will assume the member's Union member number. The member profile will be updated to include the nominee's/trustee's contact and payment information.

If an actor is deceased, the Union may determine if a nominee/trustee has been appointed to the member's estate. If a nominee/trustee is appointed, the Union may update the profile to include the nominee/trustee's contact and payment information. The member profile updates may be transmitted to the payment engine. If the nominee/trustee has selected "card" as their payment method, the payment engine may submit a card enrollment request to Pre-Paid Card so a new account can be established and card can be issued to the nominee/trustee. Once the enrollment request has been successfully processed, the nominee's/trustee's payment method may be updated to reflect "card" in the payment engine. The next payment file submitted by the Paying Entity may generate a credit transaction to the nominee's/trustee's card.

As part of Collective Bargaining Agreement (CBA), studios may deposit funds for minor actors in a protected account (interest bearing). As a result, the payment option for child actors may be restricted to check payment or other acceptable payment method.

According to another example, minor performers (through their guardians) may choose from a variety of payment options for the remaining salary after a percentage is deducted. Also, payment may be direct deposited into a blocked trust account.

Current Projects Module 316 may display and organize a member's current productions from which payment may be received. For example, an actor may receive payment from a movie studio for a movie that is currently released. In addition, the same actor may receive payments from sales of books, DVDs, CDs, etc. Depending on the type of production, the actor may also receive payment from sale of merchandise, action figures, apparel, toys, etc. In addition, the member may generate reports and other displays for organizing and viewing data.

Past Projects Module 318 may display and organize a member's past projects from which residual payments are received. For example, the member may receive residual payments from a sitcom in syndication. The member may also receive residual payments from smaller roles in movies, commercials, television shows, etc. from the actor's earlier years. In addition, the member may generate reports and other displays for organizing and viewing data.

Sources Module 320 may display and organize a member's revenue from various other sources, such as ring tones, advertisements, endorsements, etc. For example, a popular beverage company may send payments for the member's endorsements. A mobile phone service may send payments for each download of a member's ring tone. An online website (e.g., bookstore, music website, etc.) may send payments for sales from a member's merchandise (e.g., books, DVDs, CDs, apparel, etc.) and/or other products or services.

Advisor Module 322 may display and organize information for use by the member's accountant, estate planner and/or other representative. For example, Advisor Module 322 may provide an interface to allow a member and a member's authorized advisors to collaborate on payment information and/or other data. For example, Advisor Module 322 may provide a shared information interface (e.g., portal/web page/view) between a member and associated advisors to communicate and/or share information. A member may authorize a tax advisor to access Payment Engine 140 through an interface to view and/or manage relevant data. A member may authorize an estate planner to access Payment Engine 140 through an interface to track and monitor payments made to the member and further aggregate and consolidate relevant information, per the member's requests. According to one embodiment of the present invention, the system may aggregate payment data received from various Paying Entities and communicate comprehensive aggregated data to the client via an online user interface. For example, a member may receive various streams of revenues through different mediums. An advisory may aggregate this information for the member and further provide analysis and suggestions to the member. Also, a member's accountant may access the interface to gather tax information and other data to ensure compliance with laws and regulations. Advisor Module 322 may also aggregate data which may be communicated to the member via customized views and displays.

Advisor Module 322 may provide an online platform for facilitating communication between (and/or among) the member and advisor(s) and further enable members and advisors to collaborate on payment and/or other data. According to an embodiment of the present invention, a member and an associated advisor may collaborate on aggregated data via an online interface. For example, a member and an advisor can access and exchange information (e.g., documents, spreadsheets, suggestions, advice, etc.) through the Advisor Module 322. In particular, an advisor can draft a document (or provide other information) for a member's approval and enable the member to view and edit this document (or other information) through an embodiment of the present invention. Upon review, the member may then provide comments, modifications and other notations, which are accessed by the advisor. This interactive (or collaborative) functionality may occur at separate times or in real time. For example, the advisor may post a document (or provide other information) for the member's review in the morning and the member may review and revise the same document (or other information) in the evening. In another example, the advisor and member may simultaneously access the system of an embodiment of the present invention to review, discuss and/or revise the document (or other information) in real time.

Charity/Donations Module 324 may display and organize charitable contributions. For example, the member may identify a preferred charity where a percentage of the member's payment for a project may be automatically donated through the payment system. For example, a member may donate 10% of payment for a movie project to an environmental group, a third world country, medical research foundation, religious group, etc.

Expenses Module 326 may display and organize scheduled payments for a member. For example, the member may schedule periodic payments, such as mortgages for multiple residences, alimony payments, child support payments, payroll, etc.

Figure 4:
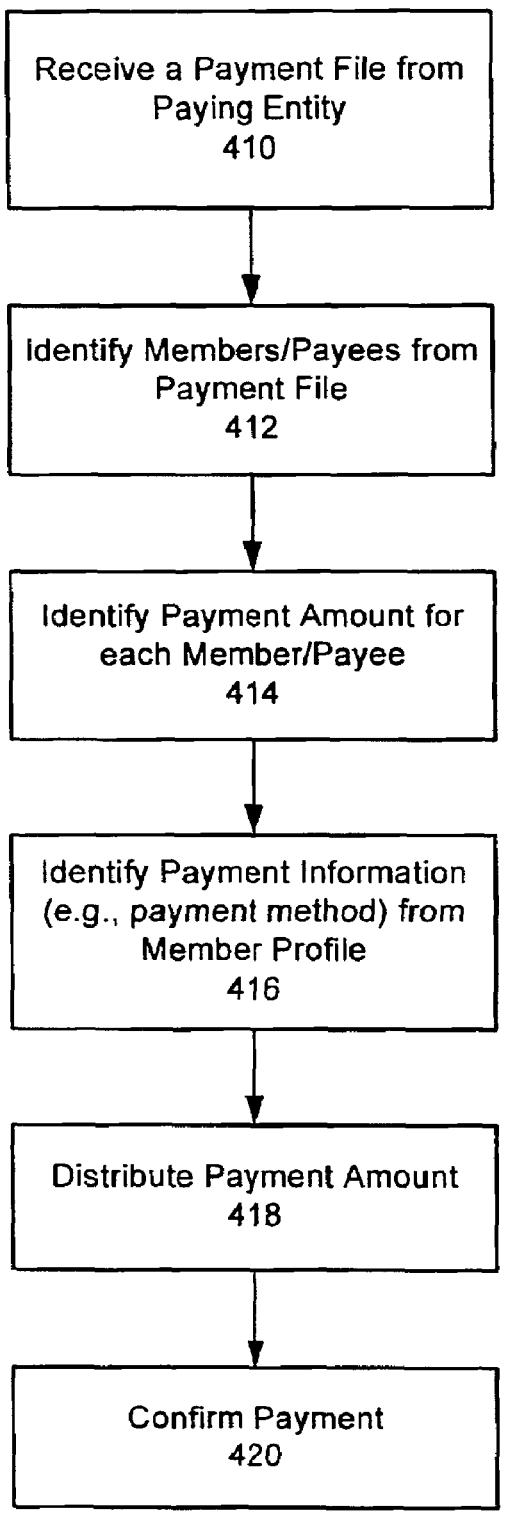
FIG. 4 is an exemplary flowchart illustrating a method for payment processing, according to an embodiment of the present invention.

FIG. 4 is an exemplary flowchart illustrating a method for payment processing, according to an embodiment of the present invention. At step 410, a payment file may be received from a paying entity for a project. At step 412, one or more members/payees may be identified from the payment file for the project. At step 414, a payment amount may be identified for each member/payee. At step 416, a payment method may be identified for each member/payee. At step 418, the payment amount may be distributed via the payment method to the member/payee. At step 420, the member/payee may be notified via an electronic transmission. These steps will be described in greater detail below.

At step 410, a payment file may be received from a paying entity. For example, a paying entity (e.g., movie studio, etc.) may transmit a payment file for a project, such as a movie production. The payment file may contain payment amounts with a list of participants of the movie production.

At step 412, one or more members/payees may be identified from the payment file for the project. As discussed above, the payment engine of an embodiment of the present invention may be integrated with a Union or other association representing a plurality of members. In addition, the payment engine may be separate and distinct from the Union. Upon receipt of the payment file, the payment engine may identify a list of payees. In this example, the payees may be members (e.g., actors) of a union (e.g., the SAG union).

At step 414, a payment amount may be identified for each member/payee. For example, the payment amount may be determined by a pre-existing contract between the paying entity and the member. Major actors may receive a percentage of the revenues from ticket sales. Other actors or participants may receive a predetermined payment amount. Other payment arrangements may be supported.

At step 416, a payment method may be identified for each payee. The payment method may include a direct deposit to one or more accounts, a check payment, a wire transfer, and a card product. In addition, the card product may support a plurality of paying entities (e.g., multiple studios, etc.) as well as a plurality of different types of paying entities (e.g., movie studios, service providers, corporations, financial institutions, etc.). Payment may be divided into multiple accounts as well as multiple payment methods. In addition, the member may identify a different payment method for other activities, such as DVD, CD, and/or other sales from merchandise and/or services. For residual payments, the member may identify yet another payment method, such as direct deposit to an account or a card product. For other members, per diem payments may be sent to a card product. The payment may also be divided among multiple accounts or payment receiving devices (e.g., card product, investment accounts, etc.). In addition, the member may request to receive payment in foreign currencies (e.g., euros, pounds, yen, etc.).

At step 418, the payment amount may be distributed via the payment method to the payee. The member profile may also indicate payment intervals (e.g., end of the month, every two weeks, etc.).

At step 420, the payee may be notified via an electronic transmission that the payment amount has been distributed via the payment method. For example, the member may select various modes of communication, such as email, text message, phone message, ring tone, etc. For example, a confirmation email to a member may be generated by the payment engine, advising the member that a payment was initiated via their chosen payment method (e.g., direct deposit, card, check, etc.) and they should visit a website or other interface to confirm the payment amount and remittance details. The website may be hosted or appear to be hosted by the Union. In addition, the Union may mail a paper statement with the remittance information for each residual payment regardless of which payment method the member chooses.

According to an embodiment of the invention, the systems and processes described in this invention may be implemented on any general or special purpose computational device, either as a standalone application or applications, or even across several general or special purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an AS/400-based operating system. For example, the computer-usable and writeable medium may be comprised of a CD ROM, a floppy disk, a hard disk, or any other computer-usable medium. One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

According to one specific embodiment of the present invention, the system may comprise components of a software system. The system may operate on a network and may be connected to other systems sharing a common database. Other hardware arrangements may also be provided.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

While the invention has been particularly shown and described within the framework of claims processing, it will be appreciated that variations and modifications can be effected by a person of ordinary skill in the art without departing from the scope of the invention. Furthermore, one of ordinary skill in the art will recognize that such processes and systems do not need to be restricted to the specific embodiments described herein.

The invention claimed is:

1. A computer implemented method for processing payments, where the method is executed by a programmed computer processor at a payment engine which communicates via a network, the method comprising the steps of:

receiving an electronic payment file at the payment engine, wherein the electronic payment file is electronically transmitted via the network from a paying entity and wherein the payment file comprises one or more payment instructions from the paying entity; identifying at least one payee from the electronic payment file;

identifying, using a payment engine, a payment amount for the at least one payee for a contribution based on a pre-existing contract between the paying entity and the at least one payee for recurring payments to the at least one payee;

identifying a payment method for the at least one payee from a payee profile associated with the at least one payee;

distributing the payment amount via the payment method to the at least one payee; and notifying the at least one payee via an electronic transmission that the payment amount has been distributed via the payment method;

wherein the at least one payee is a member of a group and the group manages the recurring payments for the at least one payee; and wherein the paying entity is one or more of a movie studio, a television studio, a sponsor and an endorsement company and the at least one payee is a participant in one or more of a movie production, a television production, a theater production, commercial and an endorsement.

2. The method of claim 1, wherein a plurality of payment files from a plurality of paying entities are received, wherein the different paying entities comprise a plurality of different sources of payment.

3. The method of claim 1, wherein the payee profile comprises a collaborative interface for one or more authorized agents and advisors.

4. The method of claim 1, wherein the payment file is received by the group managing the recurring payments for the at least one payee.

5. The method of claim 1, wherein the payee is not on a payroll of the paying entity.

6. The method of claim 1, wherein the payment method comprises one or more of a direct deposit to one or more accounts, a check payment, a wire transfer, and a card product.

7. The method of claim 6, wherein the card product supports a plurality of paying entities.

8. The method of claim 1, wherein one or more other payees are not members of the group.

9. A computer implemented method for processing payments, wherein the method is executed by a programmed computer processor at a payment engine, which communicates via a network, the method comprising the steps of:

receiving a first electronic payment file at the payment engine, wherein the first electronic payment file is electronically transmitted via the network from a first paying entity for a first project and wherein the first electronic payment file comprises one or more payment instructions from the first paying entity;

receiving a second electronic payment file at the payment engine, wherein the second electronic payment file is electronically transmitted via the network from a second paying entity for a second project and wherein the second electronic payment file comprises one or more payment instructions from the second paying entity;

identifying a payee from the first payment file and the second payment file;

identifying, using a payment engine, a first payment amount based on a first pre-existing contract between the first paying entity and the payee for recurring payments to the at least one payee;

identifying a second payment amount based on a second pre-existing contract between the second paying entity and the payee for recurring payments to the at least one payee;

identifying a payment method for the payee from a payee profile associated with the payee; and distributing the first payment amount and the second payment amount via the payment method to the payee;

wherein a group manages the recurring payments for the at least one payee; and wherein the paying entity is one or more of a movie studio, a television studio, a sponsor and an endorsement company and the at least one payee is a participant in one or more of a movie production, a television production, a theater production, commercial and endorsement.

10. A computer implemented system for processing payments at a payment engine, the system comprising:

a paying entity interface for receiving an electronic payment file at the payment engine, wherein the electronic payment file is electronically transmitted from a paying entity and wherein the payment file comprises one or more payment instructions from the paying entity; identifying at least one payee from the electronic payment file; and identifying a payment amount for the at least one payee for a contribution based on a pre-existing contract between the paying entity and the at least one payee for recurring payments to the at least one payee;

a payment method module for identifying a payment method for the at least one payee from a payee profile associated with the at least one payee; and a distribute payment module for distributing the payment amount via the payment method to the at least one payee; and a confirmation module for notifying the at least one payee via an electronic transmission that the payment amount has been distributed via the payment method;

wherein the at least one payee is a member of a group and the group manages the recurring payments for the at least one payee; and wherein the paying entity is one or more of a movie studio, a television studio, a sponsor and an endorsement company and the at least one payee is a participant in one or more of a movie production, a television production, a theater production, commercial and an endorsement.

11. The system of claim 10, wherein a plurality of payment files from a plurality of paying entities are received, wherein the different paying entities comprise a plurality of different sources of payment.

12. The system of claim 10, wherein the payee profile comprises a collaborative interface for one or more authorized agents and advisors.

13. The system of claim 10, wherein the payment file is received by the group managing the recurring payments for the at least one payee.

14. The system of claim 10, wherein the payee is not on a payroll of the paying entity.

15. The system of claim 10, wherein the payment method comprises one or more of a direct deposit to one or more accounts, a check payment, a wire transfer, and a card product.

16. The system of claim 15, wherein the card product supports a plurality of paying entities.

17. The method of claim 10, wherein one or more other payees are not members of the group.

18. A computer implemented system for processing payments at a payment engine, the system comprising:

a paying entity interface for receiving a first electronic payment file at the payment engine, wherein the first electronic payment file is electronically transmitted from a first paying entity for a first project and wherein the first electronic payment file comprises one or more payment instructions from the first paying entity; receiving a second electronic payment file at the payment engine, wherein the second electronic payment file is electronically transmitted from a second paying entity for a second project and wherein the second electronic payment file comprises one or more payment instructions from the second paying entity; identifying a payee from the first payment file and the second payment file; identifying a first payment amount based on a first pre-existing contract between the first paying entity and the payee for recurring payments to the at least one payee; identifying a second payment amount based on a second pre-existing contract between the second paying entity and the payee for recurring payments to the at least one payee;

a payment method module for identifying a payment method for the payee from a payee profile associated with the payee; and a distribute payment module for distributing the first payment amount and the second payment amount via the payment method to the payee;

wherein a group manages the recurring payments for the at least one payee; and wherein the paying entity is one or more of a movie studio, a television studio, a sponsor and an endorsement company and the at least one payee is a participant in one or more of a movie production, a television production, a theater production, commercial and an endorsement.

\* \* \* \* \*